(12) United States Patent
Montalban

(10) Patent No.: US 9,588,353 B2
(45) Date of Patent: Mar. 7, 2017

(54) NOSEPIECE FOR EYEGLASS FRAMES

(71) Applicant: VISOTTICA INDUSTRIE S.p.A, Susegana (IT)

(72) Inventor: Rinaldo Montalban, Venice (IT)

(73) Assignee: VISOTTICA INDUSTRIE S.p.A., Susegana (IT)

( * ) Notice: Subject to any disclaimer, the term of this patent is extended or adjusted under 35 U.S.C. 154(b) by 0 days.

(21) Appl. No.: 15/000,051

(22) Filed: Jan. 20, 2016

(65) Prior Publication Data

US 2016/0209674 A1    Jul. 21, 2016

(30) Foreign Application Priority Data

Jan. 20, 2015    (IT) .............................. PD20150004 U

(51) Int. Cl.
G02C 5/12    (2006.01)

(52) U.S. Cl.
CPC ......... G02C 5/122 (2013.01); *G02C 2200/16* (2013.01); *G02C 2200/20* (2013.01)

(58) Field of Classification Search
CPC ...................................................... G02C 5/12
USPC .. 351/138, 137, 136, 78, 80, 88, 76, 77, 79, 351/81, 82
See application file for complete search history.

(56) References Cited

U.S. PATENT DOCUMENTS

| | | |
|---|---|---|
| 2,250,336 A | 7/1941 | Vitolo |
| 2,274,589 A | 2/1942 | Conneely |
| 4,040,729 A | 8/1977 | Winkler |
| 4,681,411 A | 7/1987 | Taddei |
| 5,583,587 A | 12/1996 | Hasegawa |
| 5,872,612 A * | 2/1999 | MacIntosh, Jr. ......... G02C 5/12 351/136 |
| 6,793,337 B1 * | 9/2004 | Lin ......................... G02C 5/12 351/136 |
| 7,559,646 B2 | 7/2009 | Kwan |

FOREIGN PATENT DOCUMENTS

| | | |
|---|---|---|
| DE | 8815489 U | 4/1990 |
| DE | 29907947 | 8/1999 |
| DE | 10138332 | 2/2003 |
| EP | 0171461 | 10/1984 |
| FR | 2495788 | 6/1982 |
| GB | 2013360 | 8/1979 |
| WO | 2010/057883 | 5/2010 |
| WO | 2014/170477 | 10/2014 |

* cited by examiner

*Primary Examiner* — Hung Dang
(74) *Attorney, Agent, or Firm* — Mark M. Friedman

(57) ABSTRACT

Nosepiece for eyeglass frames which comprises: a plate intended to abut against the nose of a user; a support arm for connecting the plate to the frame of eyeglasses; a cup which is extended as a prolongation of the support arm; an appendage which is projectingly extended from the rear face of the plate and is housed within the cup with two lateral faces thereof facing two lateral walls of the cup; coupling means for retaining the appendage housed within the cup. The appendage comprises a convex portion which is susceptible of rotating with respect to the cup with the surface of the convex portion in contact and in sliding-with-friction relation with the internal surface of the cup, in order to maintain the plate in the reached angular position.

15 Claims, 17 Drawing Sheets

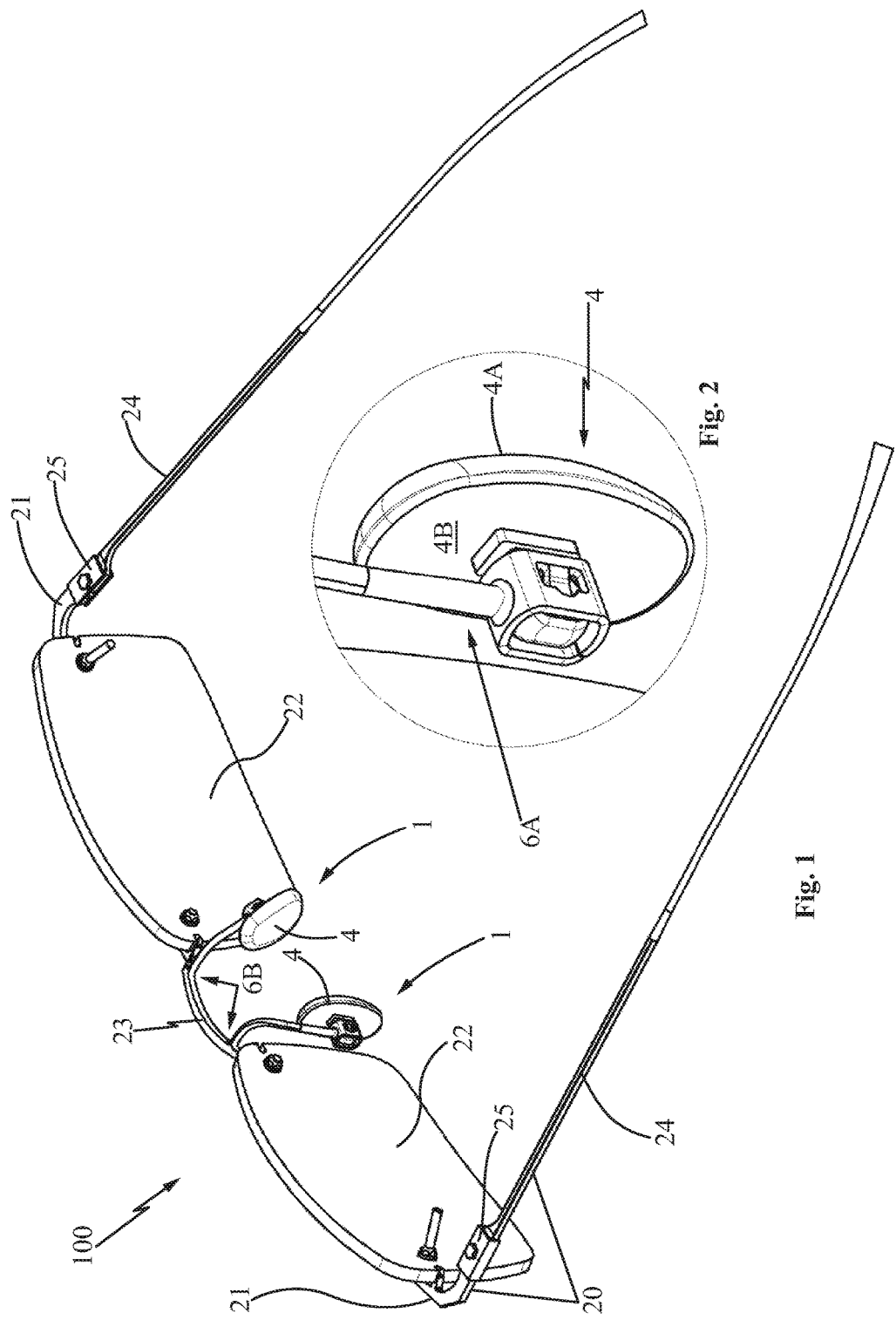

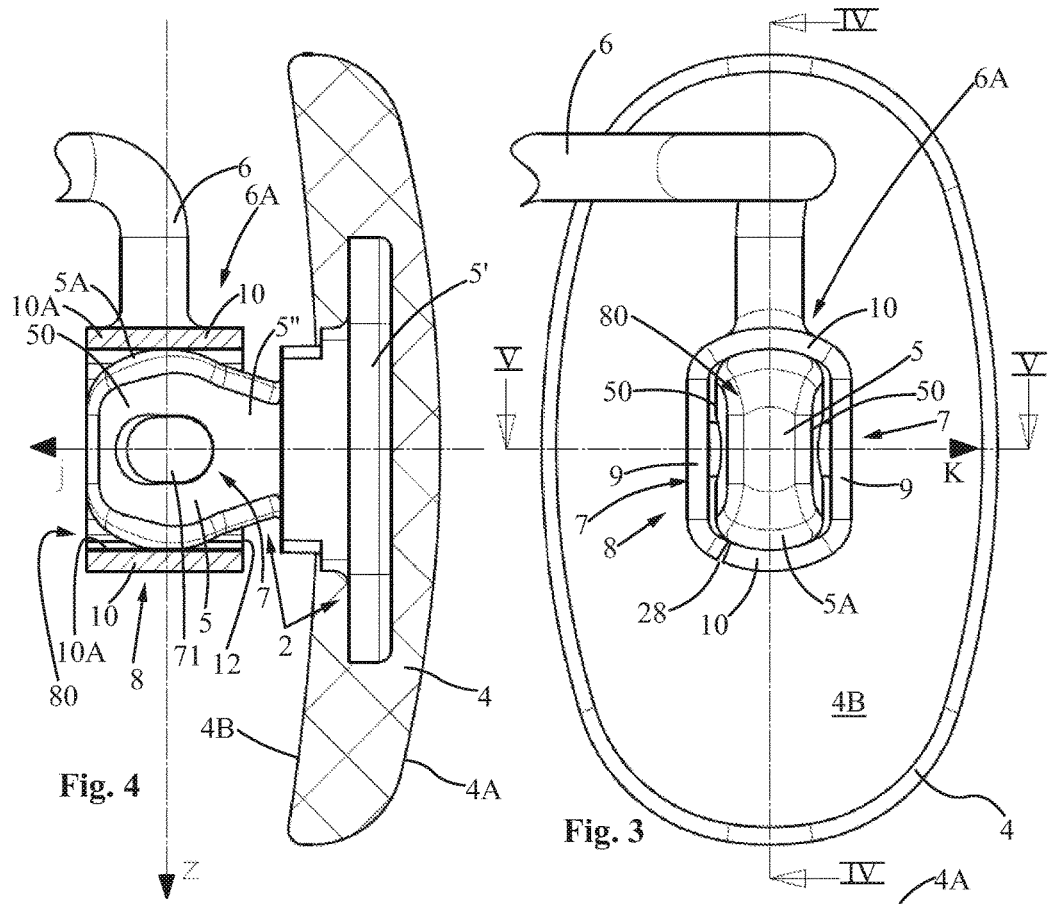
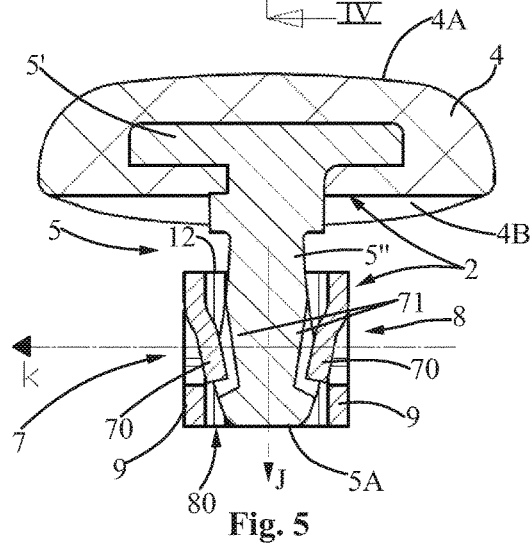

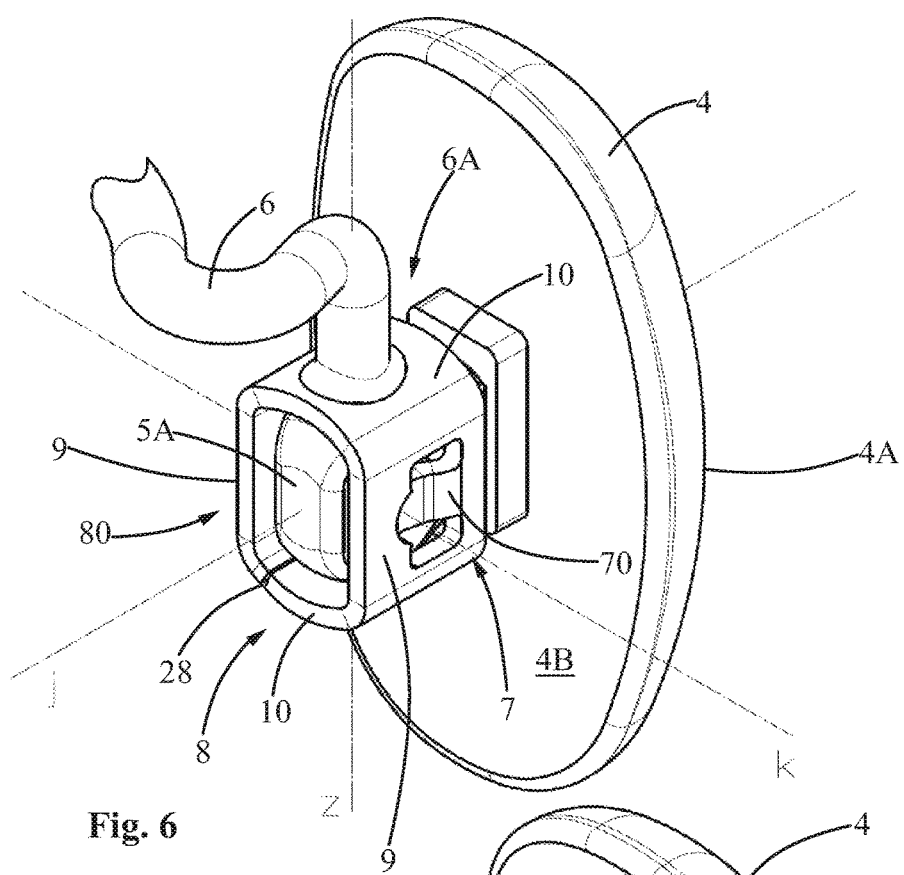
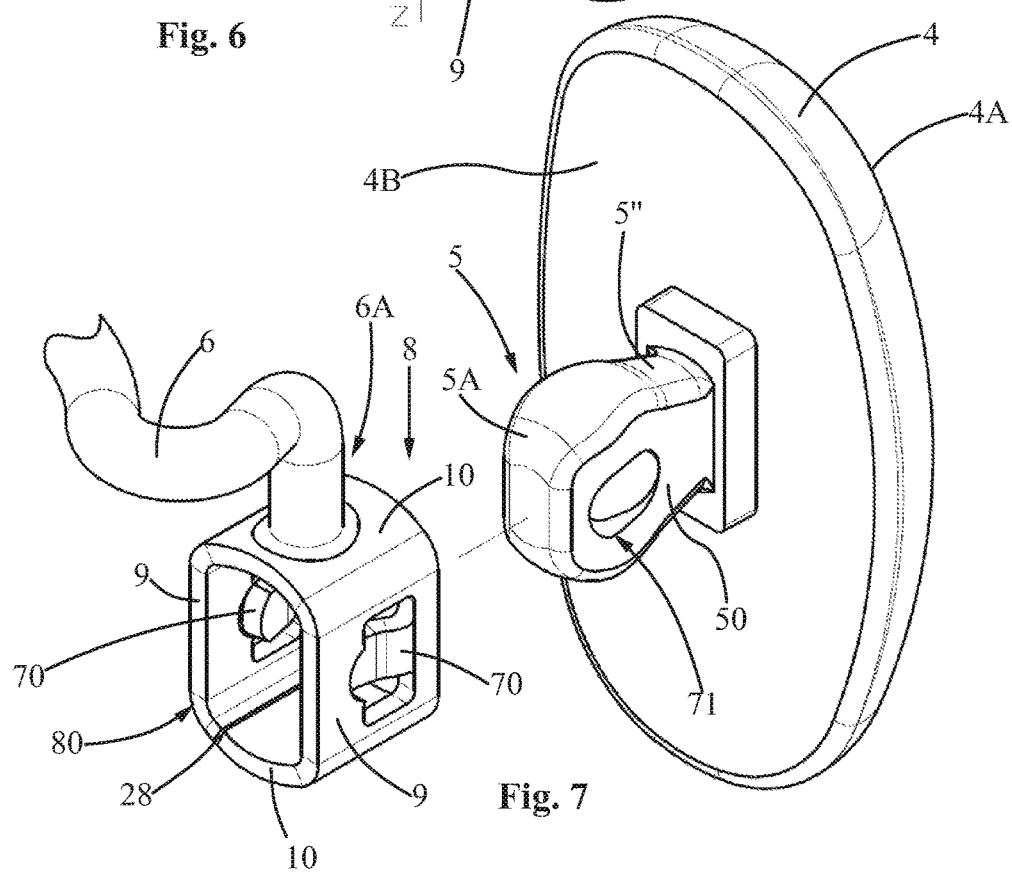

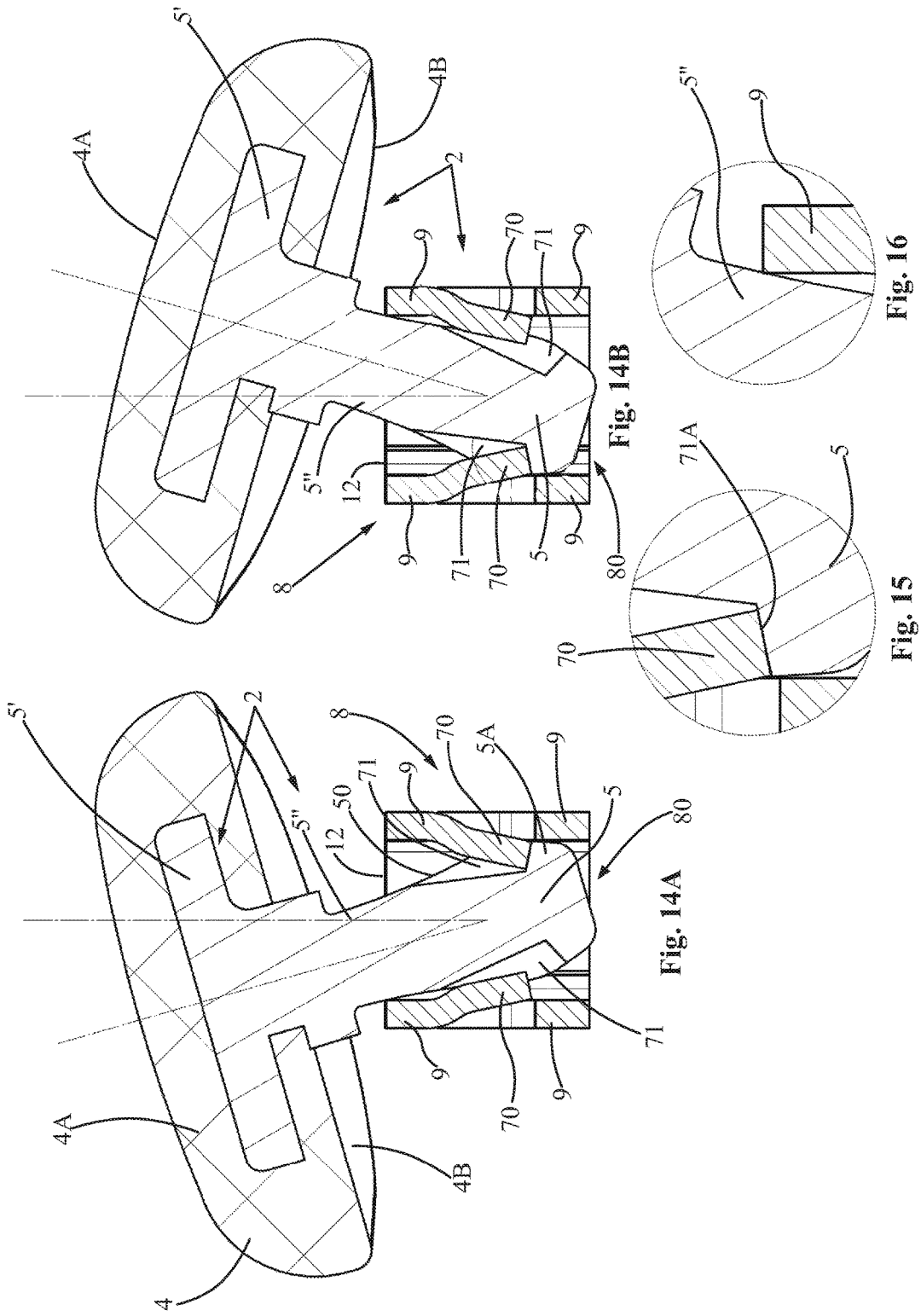

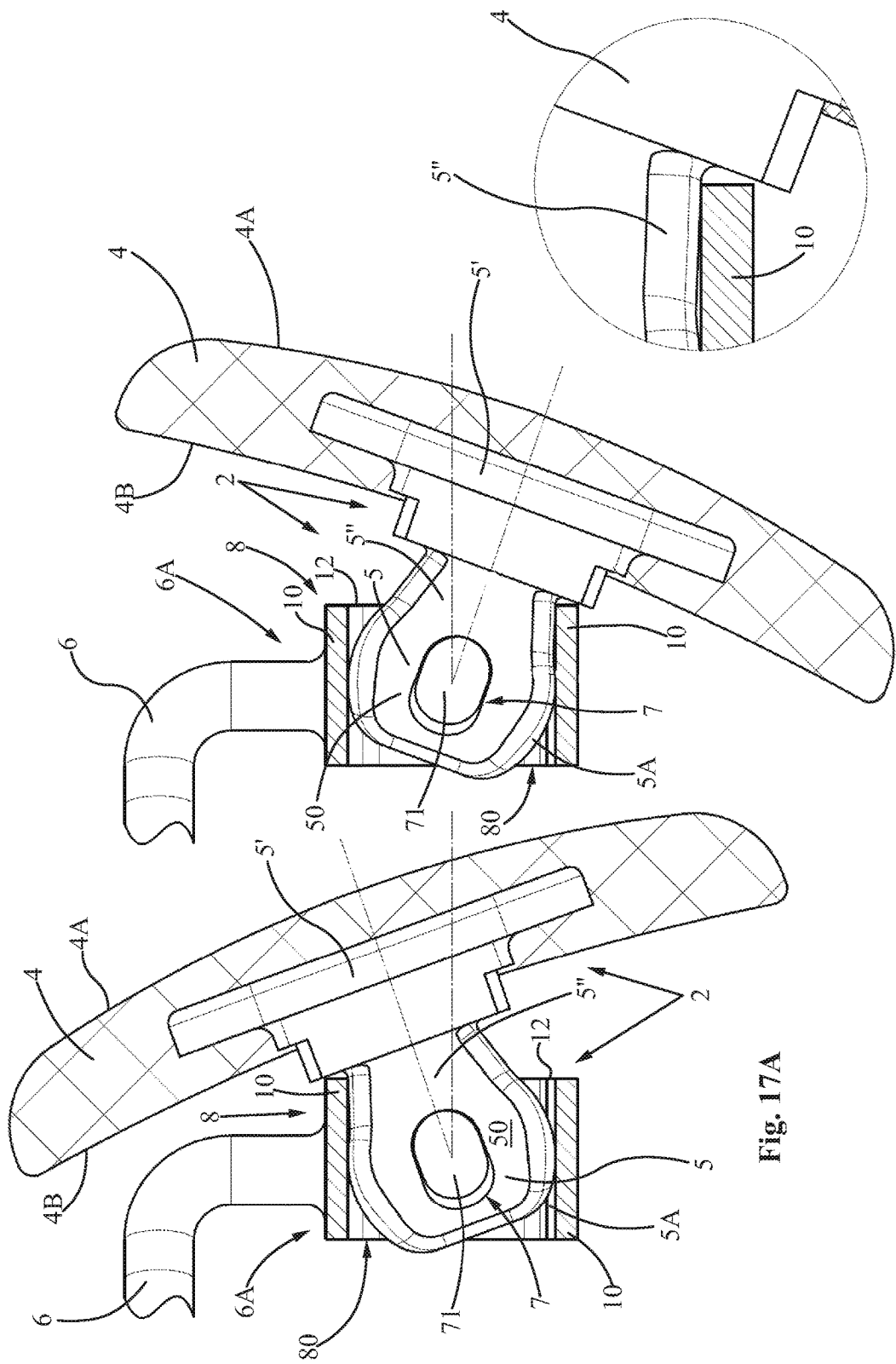

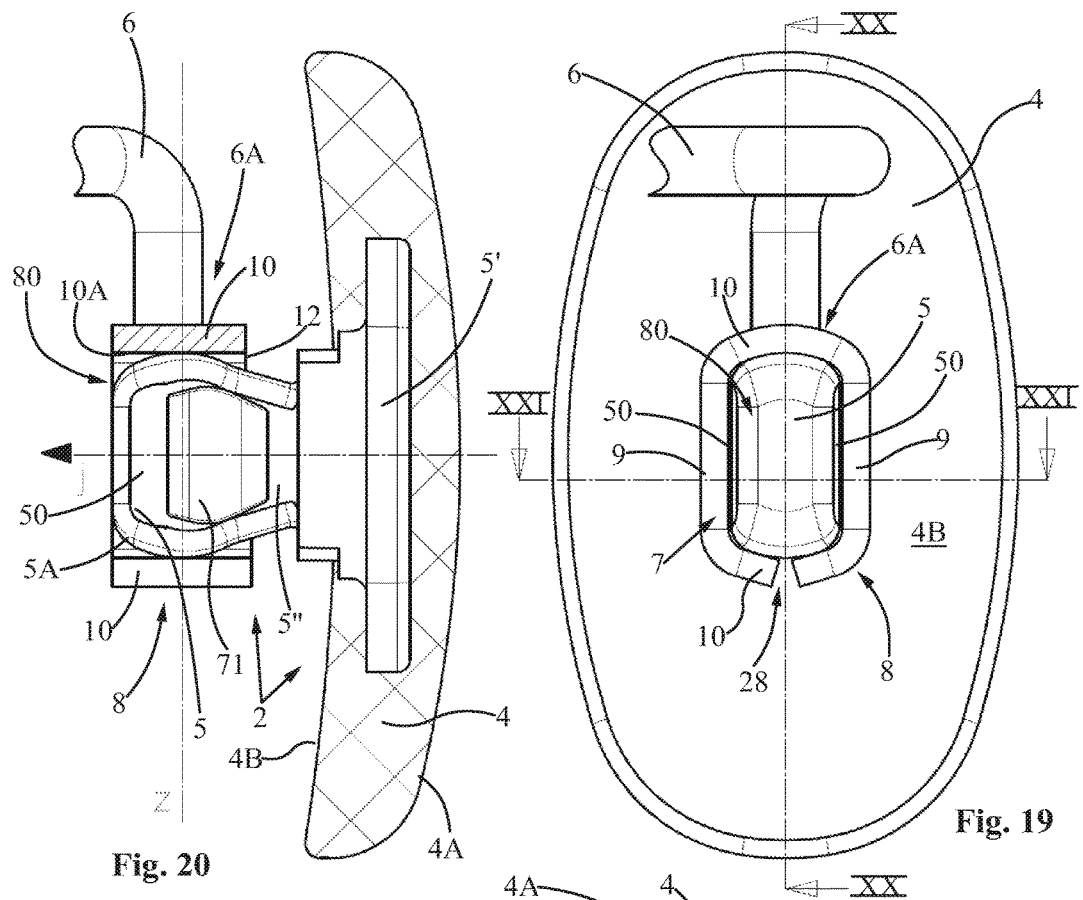
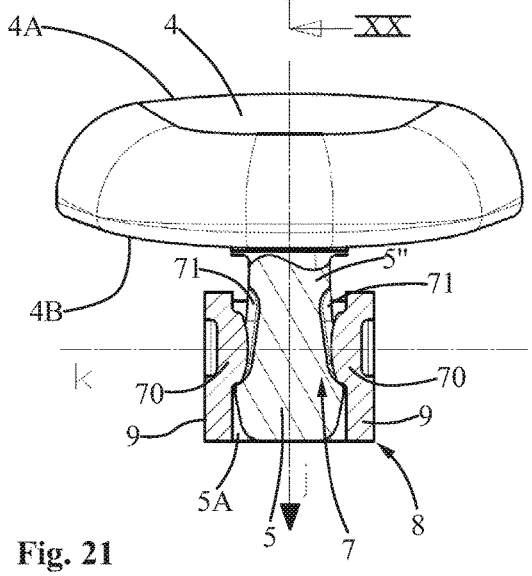
Fig. 20
Fig. 19
Fig. 21

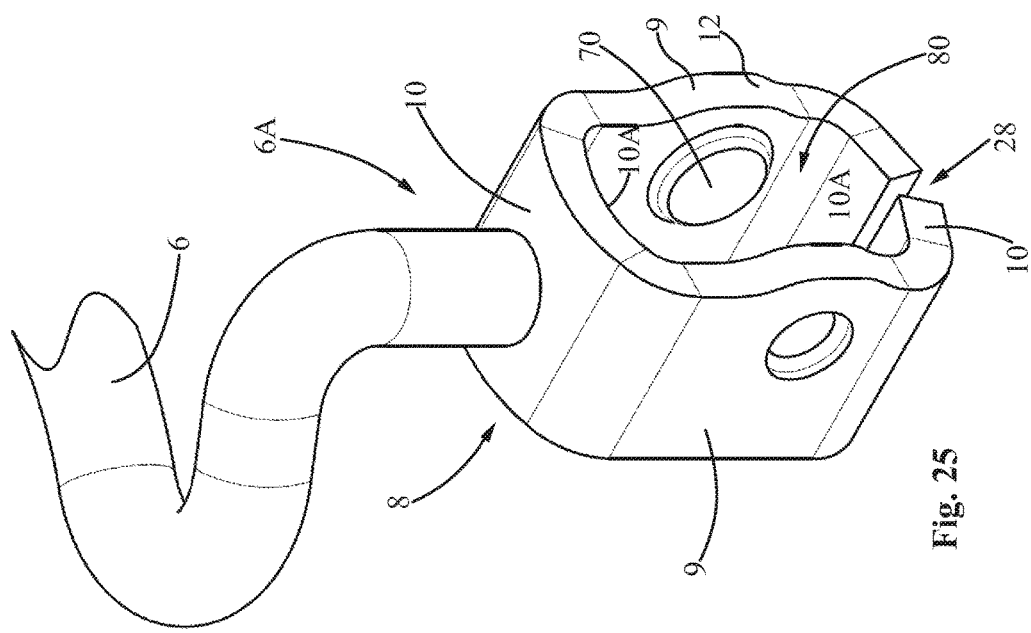
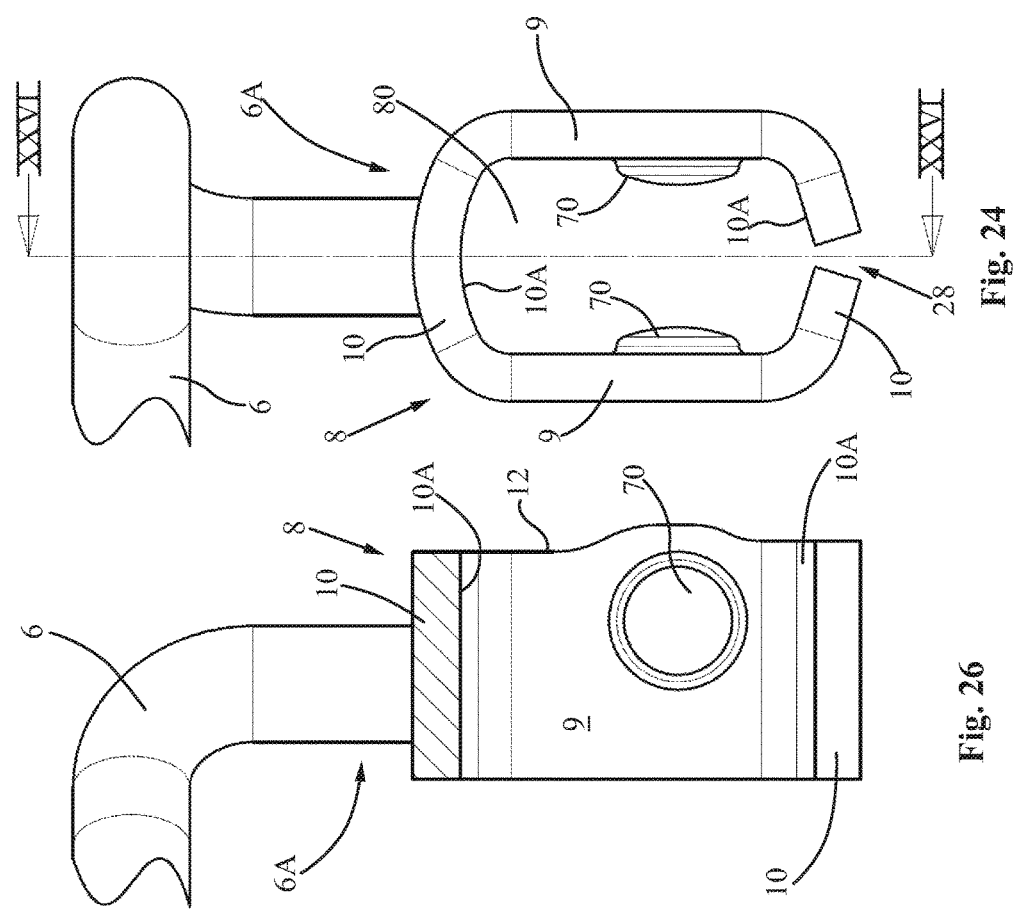
Fig. 25
Fig. 24
Fig. 26

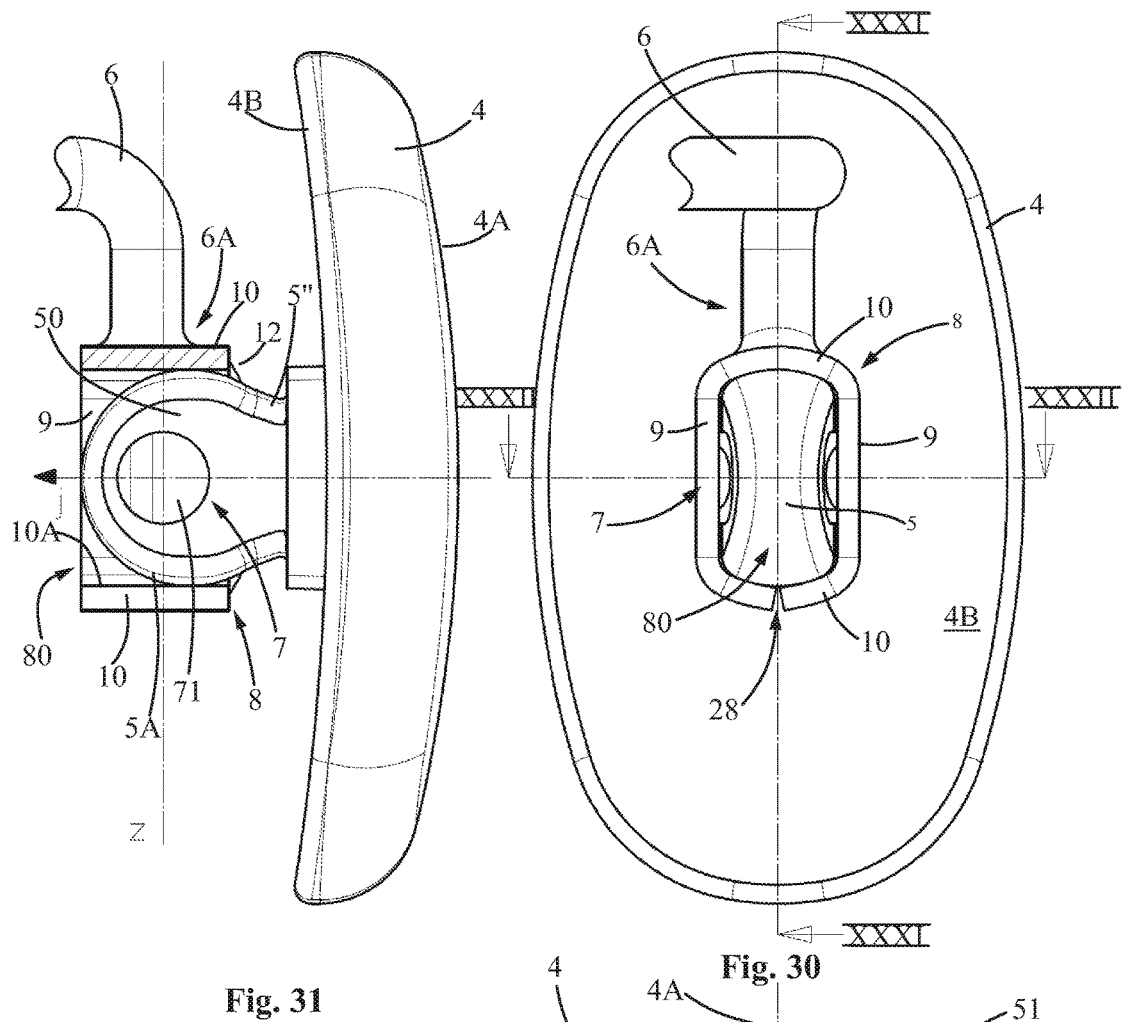

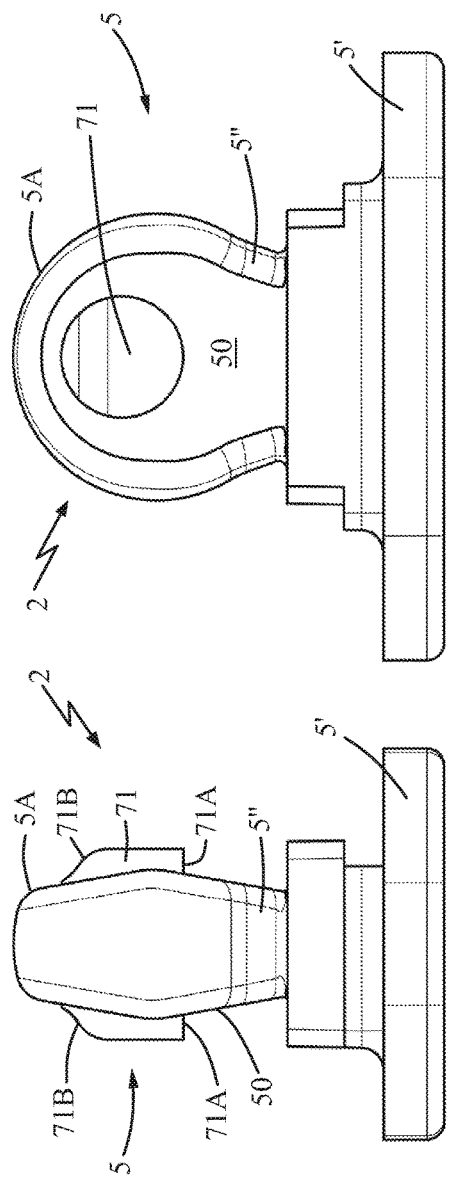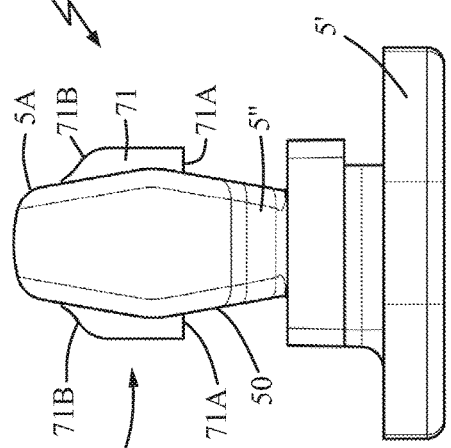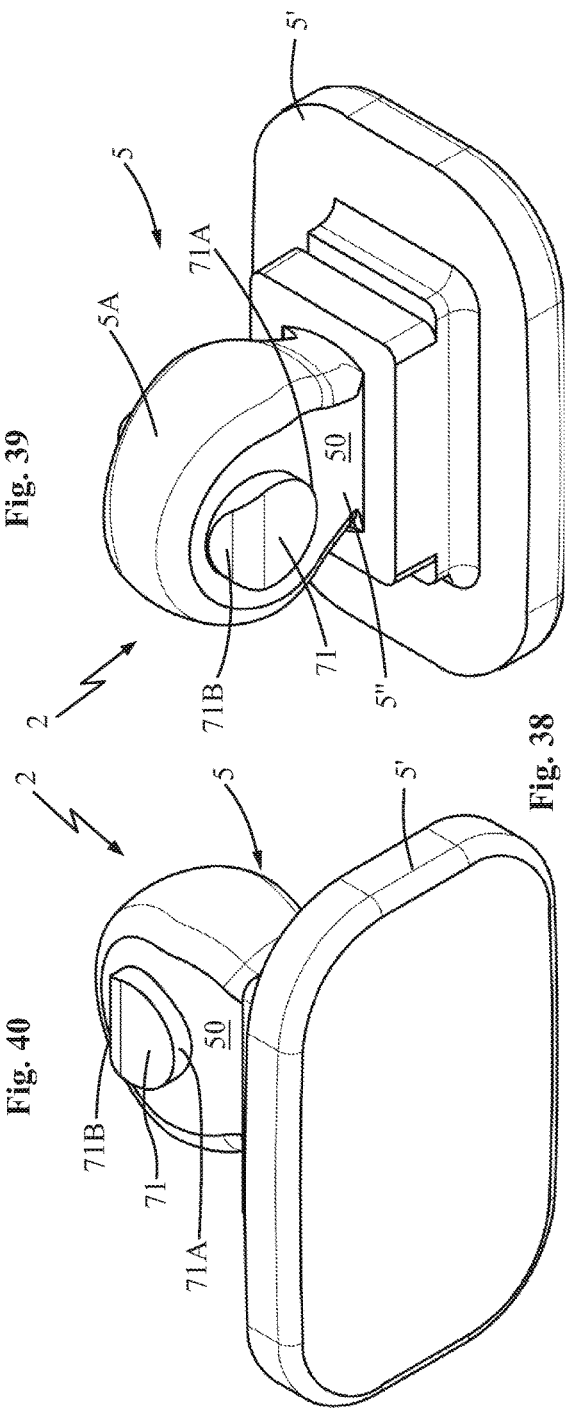

NOSEPIECE FOR EYEGLASS FRAMES

FIELD OF APPLICATION

The present invention regards a nosepiece for eyeglass frames according to the preamble of the main independent claim.

The present nosepiece is advantageously intended to be employed in the production of eyeglass frames and in particular of metal frames, in order to determine, together with a second nosepiece of a provided pair of nosepieces, a correct ergonomic position for abutting the frames against the nose of the user and hence for correctly centering the lenses with respect to the eyes, ensuring an optimal vision.

Therefore, the nosepiece, subject of the present invention, is inserted in the industrial field of eyeglasses, i.e. of the production of eyeglasses and accessories and components for eyeglasses.

STATE OF THE ART

Conventionally, in the eyeglasses field, nosepieces are integrated in the frame in order to support the eyeglasses on the nose of the user with maximum comfort.

In accordance with one of the most widespread embodiments on the market, each nosepiece consists of a plate, provided with a front face, intended to abut against the nose of a user, and with a rear face from which an appendage is projectingly extended that is engaged in a cup-shaped hollow body provided at a first end of a support arm (or hook), in turn fixed at its second end to the frame.

Usually the plate is made of soft plastic material (such as PVC or silicone), at whose interior an insert made of harder material is partially embedded (also made of plastic material, e.g. polycarbonate, or made of metal), which forms the projecting appendage intended to be joined with the support arm.

Means are provided for coupling the appendage to the cup in order to prevent the undesired exit of the appendage from the cup and hence the separation of the plate from the arm of the nosepiece.

In accordance with one possible embodiment, the coupling means comprise a screw, aimed to retain the appendage in the cup. The screw is inserted in a transverse hole of the cup and is engaged with the appendage of the plate.

These nosepieces of conventional type, with coupling means provided with screw, if on one hand they have the advantage of attaining an attachment type that is simple, strong and which allows an easy and quick substitution of the plate in case of need or wear, on the other hand they have the limit of a poor position adjustment of the plate for an optimal adaptation thereof to the shape of the nose.

As is known, one of the requirements for user comfort is that the eyeglasses correctly fit on the face, and that therefore among other things the nosepieces have good mobility in order to be adapted to the various shapes of the user's nose.

This mobility depends mainly on a good connection between the plate and the support arm ensured by the retention means. Usually the screw retention means have the drawback of ensuring a small mobility and presenting the plate which "rocks" in an undesired manner on the support arm of the frame of the eyeglasses.

A further drawback of these nosepieces lies in the high production cost due to the numerous components for making the coupling means between the screw and the cup and due to the normal need to fix the cup to the first end of the support arm via welding.

In order to overcome these drawbacks, nosepieces were obtained with coupling means for the plates of ball socket type, which increase the possibilities of adaptation of the nosepiece to the shape of the user's nose.

Examples of nosepieces of this type are described in the following patents: U.S. Pat. No. 4,681,411; U.S. Pat. No. 2,274,589; U.S. Pat. No. 7,559,646; GB 2013360; WO 2010057883; DE 8815489U; EP 171461 and WO 2014170477.

The nosepieces of known type described in these patents do not entirely lack drawbacks, given that the coupling means of balllsocket type described up to now do not allow a simple and quick mounting and dismantling of the plate.

There, the coupling means of balllsocket type, if on one hand they have improved the possibilities of adjustment of the plates with respect to the coupling means of screw type, on the other hand they have made the substitution of the worn plates with new ones more complex.

Generally, the coupling means of balllsocket type comprise a ball and a corresponding ball seat joined together by means of form coupling obtained with elastic or plastic deformation of one of the two components (usually the hemispherical seat).

Consequently, with the limited sizes of these components, the coupling means of ball/socket type (which in some of the known nosepiece solutions indicated above are made of plastic material) have a very high risk of breakage.

Another drawback of the nosepieces employing coupling means of ball/socket type of known type lies in the lack—in most cases—of suitable means for limiting the rotation of the plate, or even in the case of presence of the latter (such as in the case of the nosepiece described in the patent U.S. Pat. No. 4,681,411), they are in any case unsuitable and not strong.

Other solutions are known of nosepieces with means for coupling the appendages of the plates to the cups of the support arms with portions which are coupled by means of a snap coupling mechanism, normally termed "click" coupling mechanism. Examples of solutions of nosepieces with this known type are described in the following patents: FR 2495788; U.S. Pat. No. 4,040,729; DE 10138332; U.S. Pat. No. 2,250,336; DE 2990794U and U.S. Pat. No. 5,583,587.

Usually, in this solution type, the appendage of the plate has first coupling elements formed by one or more recesses (in the form of a through hole obtained transverse to the appendage, or with two through slots obtained along the high/low direction), while the arm terminates with a cup, on whose lateral walls second coupling elements are obtained that are constituted by small projections which come to be inserted in a fitting manner in the recesses of the insert by means of elastic deformation of the cup.

Such known solutions of nosepieces can in an equivalent manner have the first and the second coupling elements reversed with respect to the above-described case, i.e. have the projections obtained on the appendage and the slots obtained on the lateral walls of the cup, as can be seen in some of the variants described in the abovementioned patents.

Such solutions of nosepieces are particularly simple and inexpensive, since they require a very limited number of components and they do not require the screw.

The cup is generally quite simply obtained from a suitably bent metal strip, the appendage/cup snap coupling is fast and does not require particular tools or equipment.

Such nosepieces with coupling means with snap coupling nevertheless have in practice difficulties in adjusting the position of the plate, which is not provided with sufficient mobility for supporting the form of the nose.

More specifically, the appendage/cup connection depends on how the joint is made: if the coupling has clearance, the appendage will tend to "rock" in an anti-aesthetic manner on the frame of the eyeglasses. If instead the coupling tolerances are more restricted, the two components will be fixed to each other, and actually not allow the adjustment of the plate on the nose.

PRESENTATION OF THE INVENTION

In this situation, the problem underlying the present invention is to eliminate the drawbacks of the abovementioned prior art, by providing a nosepiece for eyeglass frames that is simultaneously capable of offering an easy mounting and a precise adjustment of the position of the plate with respect to the nose of the user.

A further object of the present finding is to provide a nosepiece for eyeglass frames that is interchangeable with respect to the nosepieces with means for coupling the appendage to the cup of conventional snap type.

A further object of the present finding is to provide a nosepiece for eyeglass frames that can be easily made in automatic eyeglass production processes.

A further object of the present finding is to provide a nosepiece for eyeglass frames that has a high mechanical strength and offers a high assurance of plate retention.

A further object of the present finding is to provide a nosepiece for eyeglass frames that allows adjusting the position of the plate with greater tilt angles with respect to the nosepieces of known type.

A further object of the present finding is to provide a nosepiece for eyeglass frames which has precise and robust means for limiting the rotation of the plate.

A further object of the present finding is to provide a nosepiece for eyeglass frames which allows maintaining the position assumed by the plates saved/in place, even after the eyeglasses have been taken off.

A further object of the present finding is to provide a nosepiece for eyeglass frames which is considerably compact.

BRIEF DESCRIPTION OF THE DRAWINGS

The technical characteristics of the finding, according to the aforesaid objects, can be clearly seen in the contents of the below-reported claims and the advantages thereof will be clearer from the following detailed description, made with reference to the enclosed drawings, which represent several merely exemplifying and non-limiting embodiments of the invention, in which:

FIG. 1 shows an eyeglass frame with nosepieces according to the present invention mounted thereon;

FIG. 2 shows an enlarged detail of the eyeglass frame of FIG. 1 relative to one of the two nosepieces according to the present invention;

FIG. 3 shows a rear view of the nosepiece according to the invention;

FIG. 4 shows a longitudinal section view of the nosepiece of FIG. 3 made along the line IV-IV of the same FIG. 3;

FIG. 5 shows a cross section view of the nosepiece of FIG. 3 made along the line V-V of the same FIG. 3;

FIG. 6 shows a rear perspective view of the nosepiece according to the invention;

FIG. 7 shows a rear perspective view of the nosepiece according to the invention with its two components illustrated in exploded view;

FIGS. 14A and 14B show the nosepiece according to the invention in two different adjustment positions, rotated with respect to each other with respect to a first adjustment axis Z;

FIG. 15 shows an enlarged detail of FIG. 14B relative to the end stop of the rightward rotation of the plate;

FIG. 16 shows another enlarged detail of FIG. 14B relative to the end stop of the rightward rotation of the plate in accordance with a further embodiment possibility of such end stop;

FIGS. 17A and 17B show the nosepiece according to the invention in two different adjustment positions, rotated with respect to each other with respect to a second adjustment axis K;

FIG. 18 shows an enlarged detail of FIG. 17B relative to the end stop of the downward rotation of the plate;

FIG. 19 shows a rear view of a second embodiment of a nosepiece according to the invention;

FIG. 20 shows a longitudinal section view of the nosepiece of FIG. 19 made along the line XX-XX of the same FIG. 19;

FIG. 21 shows a cross section view of the nosepiece of FIG. 19 made along the line XXI-XXI of the same FIG. 19;

FIG. 24 shows an enlarged detail of the nosepiece of FIG. 19 according to the second embodiment of the invention in a rear view, relative to a support arm and a cup fixed thereto;

FIG. 25 shows a perspective view of the detail of FIG. 24;

FIG. 26 shows a section view of the detail of FIG. 24 made along the line XXVI-XXVI of the same FIG. 24;

FIG. 30 shows a rear view of a third embodiment of a nosepiece according to the invention;

FIG. 31 shows a longitudinal section view of the nosepiece of FIG. 30 made along the line XXXI-XXXI of the same FIG. 30;

FIG. 32 shows a cross section view of the nosepiece of FIG. 30 made along the line XXXII-XXXII of the same FIG. 30;

FIG. 38 shows an enlarged detail of the nosepiece according to the third embodiment of the invention in a rear perspective view, relative to an insert of an abutment plate on the nose;

FIG. 39 shows a first side view of the detail of FIG. 38;

FIG. 40 shows a second side view of the detail of FIG. 38;

DETAILED DESCRIPTION OF A PREFERRED EMBODIMENT

Figure 8:
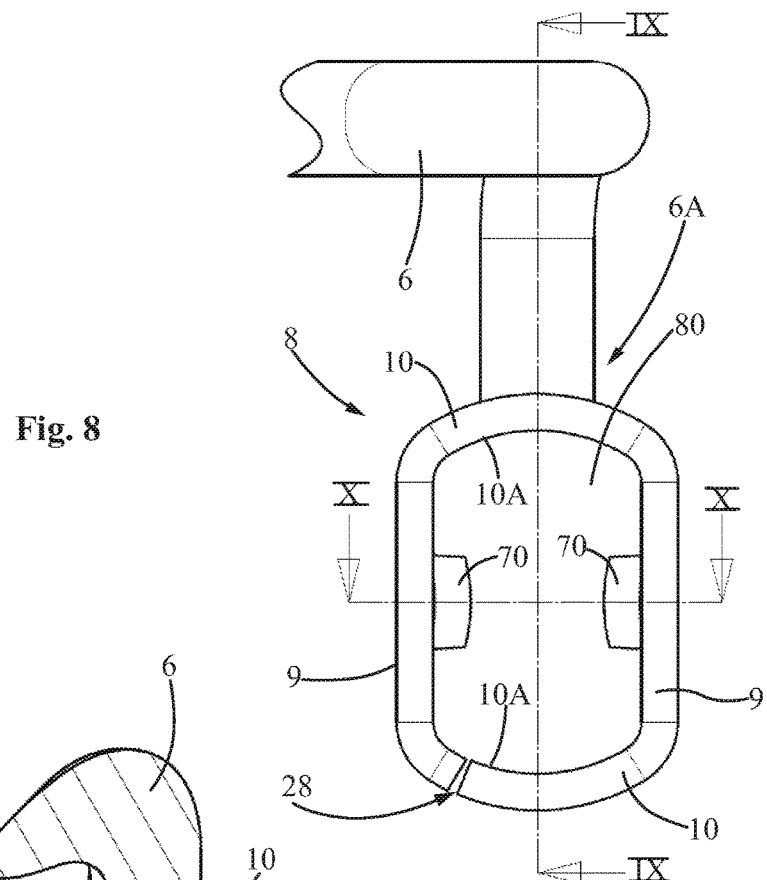
FIG. 8 shows an enlarged detail of the nosepiece according to the invention in a rear view, relative to a support arm and a cup fixed thereto.
Figure 9:
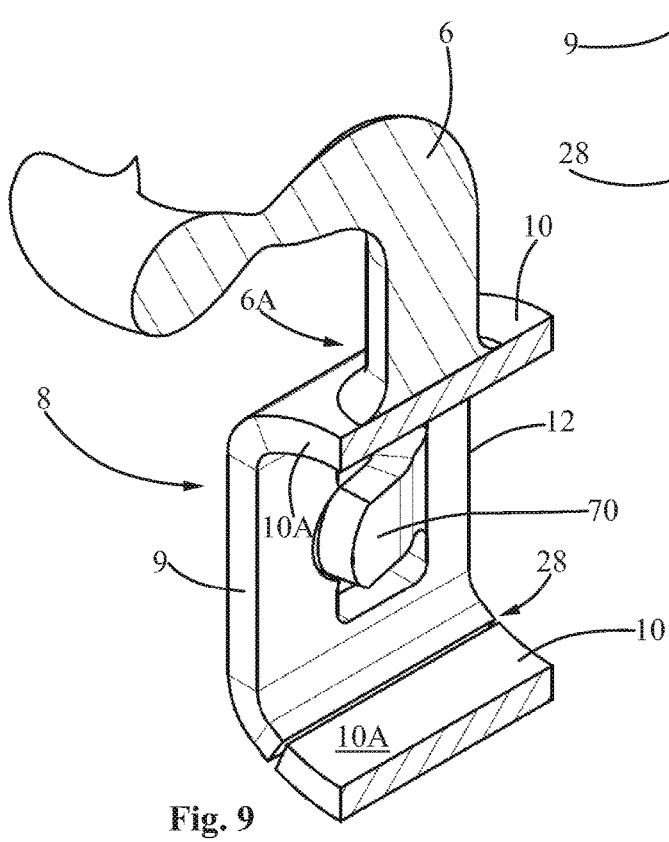
FIG. 9 shows a perspective view of a section of the detail of FIG. 8 made along the line IX-IX of the same FIG. 8.
Figure 10:
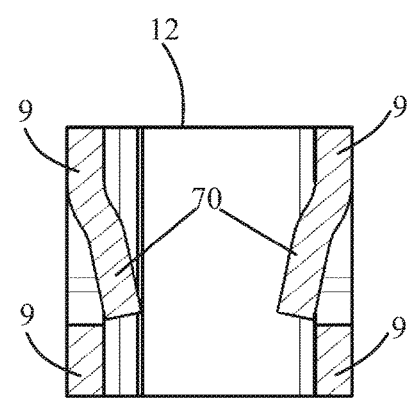
FIG. 10 shows a section view of the detail of FIG. 8 made along the line X-X of the same FIG. 8.
Figure 11:
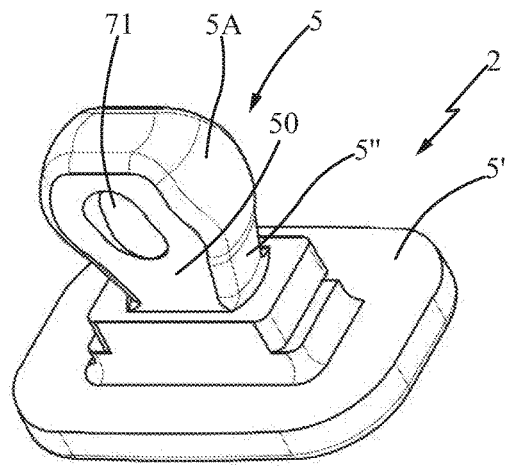
FIG. 11 shows an enlarged detail of the nosepiece according to the invention in a rear perspective view, relative to an insert of an abutment plate on the nose.
Figure 13:
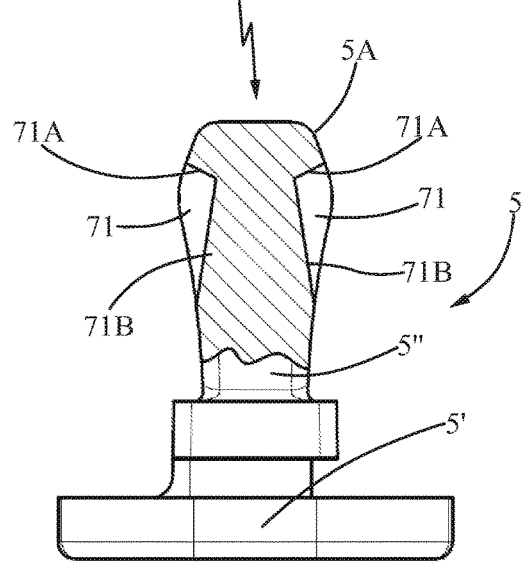
FIG. 13 shows a view partially in section of the detail of FIG. 12 made along the line XIII-XIII of the same FIG. 12.
Figure 12:
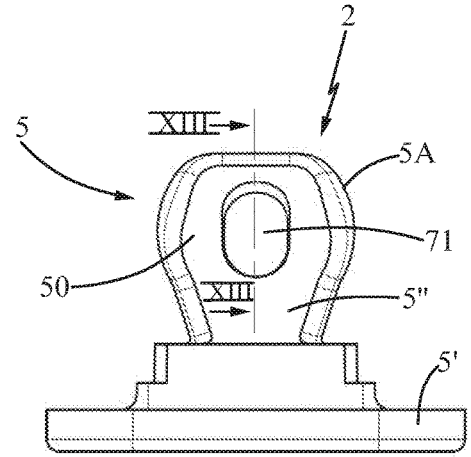
FIG. 12 shows a side view of the detail of FIG. 11.
Figure 22:
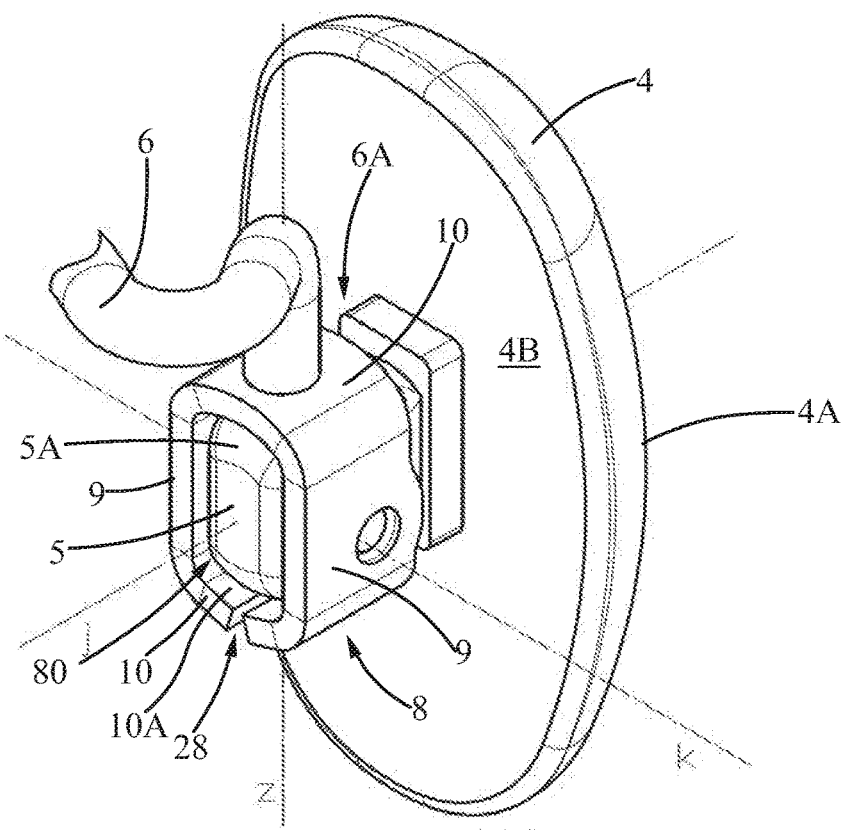
FIG. 22 shows a rear perspective view of the nosepiece of FIG. 19 according to the second embodiment of the invention.
Figure 23:
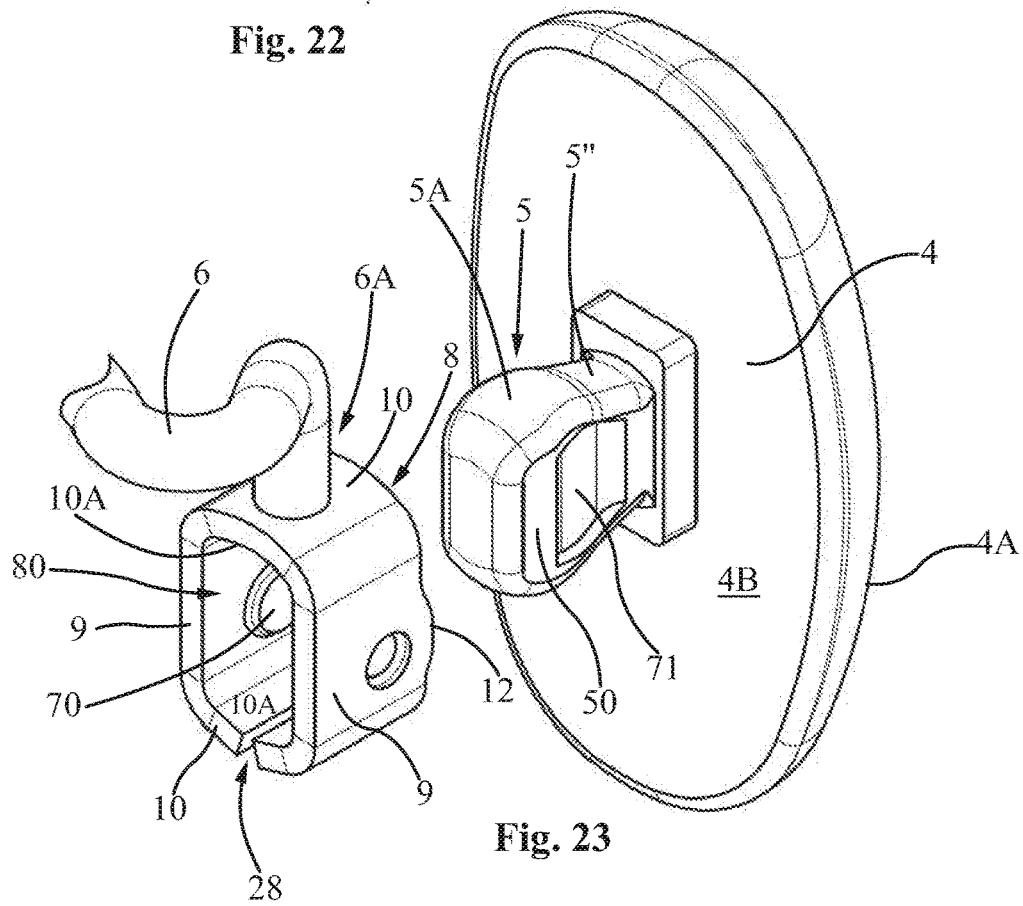
FIG. 23 shows a rear perspective view of the nosepiece of FIG. 19 according to the second embodiment of the invention, with its two components illustrated in exploded view.
Figure 28:
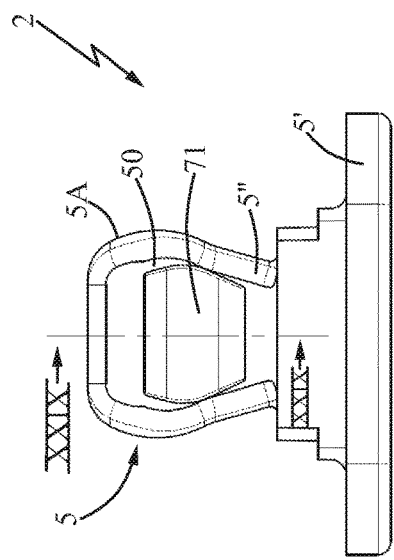
FIG. 28 shows a side view of the detail of FIG. 27.
Figure 27:
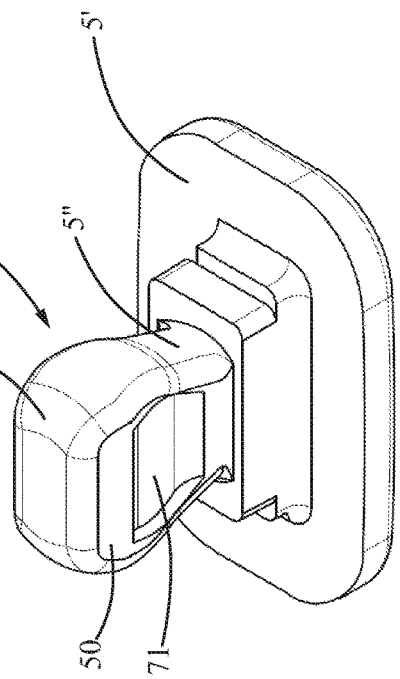
FIG. 27 shows an enlarged detail of the nosepiece according to the second embodiment of the invention in a rear perspective view, relative to an insert of an abutment plate on the nose.
Figure 29:
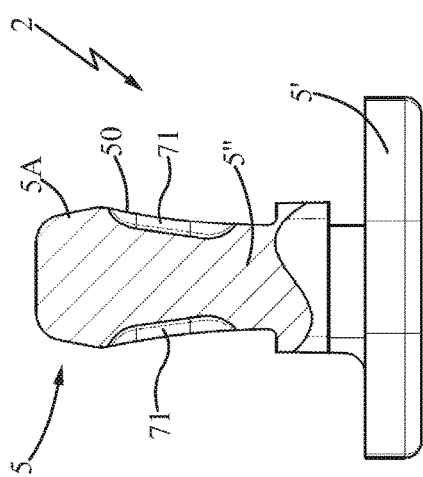
FIG. 29 shows a view partially in section of the detail of FIG. 28 made along the line XXIX-XXIX of the same FIG. 28.
Figure 33:
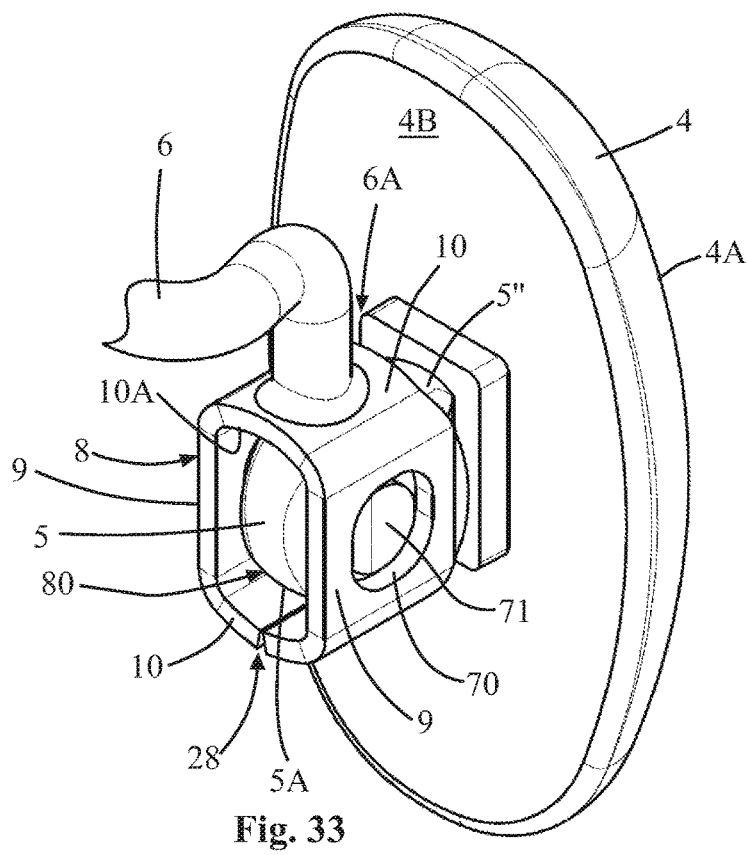
FIG. 33 shows a rear perspective view of the nosepiece of FIG. 30 according to the third embodiment of the invention.
Figure 34:
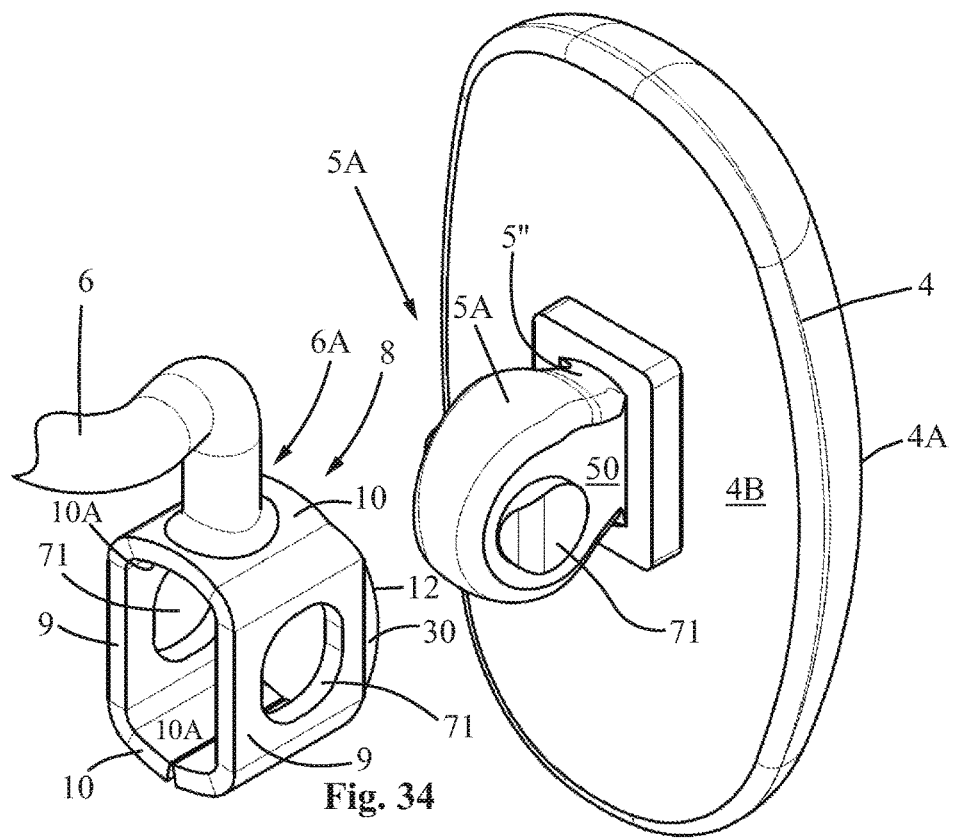
FIG. 34 shows a rear perspective view of the nosepiece of FIG. 30 according to the third embodiment of the invention, with its two components illustrated in exploded view.
Figures 35, 36, 37:
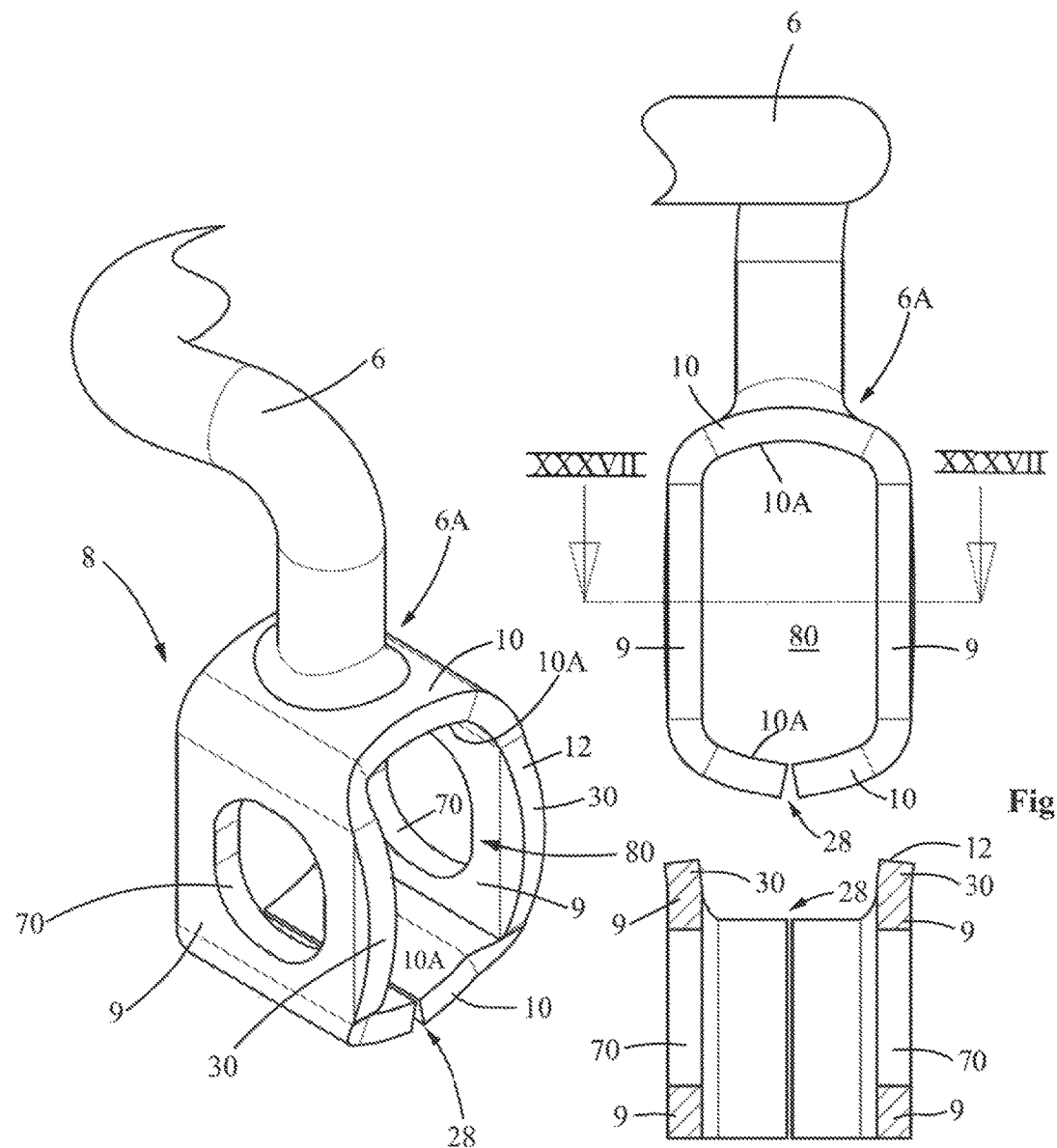
FIG. 35 shows an enlarged detail of the nosepiece of FIG. 30 according to the third embodiment of the invention in a rear view, relative to a support arm and a cup fixed thereto.
FIG. 36 shows a perspective view of the detail of FIG. 35.
FIG. 37 shows a section view of the detail of FIG. 35 made along the line XXXVII-XXXVII of the same FIG. 35.

With reference to the enclosed drawings, reference number 1 overall indicates a nosepiece for eyeglass frames, object of the present invention.

The nosepiece 1, according to the present invention, is intended to contribute to the attainment of frames 20 for eyeglasses 100 of both conventional and sports type, and is adapted to be abutted, in a per se known manner, against the nose of a user in order to correctly support the lenses with respect to the eyes.

More in detail, the frame 20 is usually formed by a front 21, which supports a pair of lenses 22, connected in the central part by a bridge 23, and by a pair of arms 24 pivoted by means of hinges 25 placed on the sides of the front and, more precisely, at two lateral portions thereof directed towards the rear part of the eyeglasses and known in the technical jargon of the field with the term end pieces.

The frame 20 per se, intended formed by the set of the front and the arms, can be of entirely conventional type and therefore it is described in the present description only in summary, given that its structural principles are well known to a man skilled in the art.

The nosepiece 1 according to the invention can be fixed both to a plastic and metal frame 20; nevertheless, it was advantageously mainly designed for a use with metal frames 20.

The nosepiece 1, object of the present invention, comprises in a per se conventional manner a plate 4 for the abutment of the eyeglasses against the nose of the user, and a support arm 6 for connecting the plate to the frame 20 of the eyeglasses 100.

More in detail, the plate 4 is provided with a front face 4A, intended to abut against the nose of a user, and with a rear face 4B mechanically connected to the frame 20 by means of the support arm 6.

The latter is provided with a first end 6A mechanically associated with the plate 4 as described in detail hereinbelow and with a second end 6B fixed to the frame 20 of the eyeglasses 100.

The fixing of the support arm 6 to the frame 20 of the eyeglasses 100 can be obtained for example by means of welding to the bridge 23 or to the rims of the front 21 of the frame 20, if the latter is made of metal, or by embedding the projecting portions provided at the second end 6B of the arm in the plastic material matrix of the frame 20, if the latter is made of plastic material.

The arm 6 is advantageously composed of an elongated metal element, obtained starting from a round wire or from a strip with quadrangular section, suitably bent with one or more bends for supporting the plate 4 on the nose with the correct tilt starting from the frame 20.

The plate 4 has substantially flattened form, such that its two faces are substantially parallel. The plate 4 is preferably made of a soft plastic material, such as PVC or silicone, and is intended to come into direct contact with the nose of the user, making a seal against the slipping of the eyeglasses and simultaneously ensuring a high level of comfort for the user.

The nosepiece 1 then comprises an appendage 5, which is projectingly extended from the rear face 4B of the plate 4 substantially along a main extension axis J orthogonal to the plane of the same plate 4, aimed to orient the latter substantially in the direction of the nose of the user once the eyeglasses 10 are put on.

The appendage 5 is preferably made of a harder plastic than the plate 4, for example polycarbonate or peek, even if the appendage 5 and plate 4 can otherwise be made with a single element in a single body or even of the same material.

The appendage 5 is preferably part of an insert 2 which is also provided with a support portion 5' in a single body with the appendage 5, advantageously embedded in the softer plastic material of the plate 4.

The support portion 5' is a flat body on which ornaments or logos can be obtained, which are then visible through plate 4 if this is made of transparent material.

Each nosepiece 1 also comprises a cup 8, which is fixed to the support arm 6 at its first end 6A along a first adjustment axis Z in particular as a prolongation of the extension of the same support arm 6, and is provided with at least two opposite lateral walls 9, joined together by at least one connection wall 10.

Advantageously, the two lateral walls 9 are joined together at both ends by means of two connection walls 10 (of which one is substantially upper and one substantially lower) so as to form a ring delimiting an internal containment chamber 80.

The upper and lower connection walls 10 can have a flat progression or be advantageously shaped with concave form towards the interior of the containment chamber 80, in particular with cylindrical cap form.

The appendage 5 projecting from the rear face 4B of the plate 4 is at least partially housed within said cup 8 with its two lateral faces 50 facing the two lateral walls 9 of the cup 8.

Coupling means 7 are then provided for retaining the appendage 5 housed inside the cup 8, which comprise first and second anchorage elements 70, 71, the first 70 associated with the lateral walls 9 of the cup 8, and the second 71 associated with the facing lateral faces 50 of the appendage 5, respectively. Such first and second anchorage elements 70, 71 must be intended to be an integral part in a single body of the lateral walls 9 of the cup 8 and of the lateral faces 50 of the appendage 5 and not as a separate element.

Such first and second anchorage means 70, 71 are mechanically engaged with each other and aligned along a second adjustment axis K, substantially orthogonal to the first longitudinal axis Z and advantageously substantially horizontal.

The appendage 5 is retained in the cup 8 with a sufficient mechanical engagement to prevent the accidental extraction thereof, by means of in particular the presence of abutment faces which will be described in detail hereinbelow with reference to different embodiments, all falling within a same inventive concept.

According to the idea underlying the present invention, the appendage 5 comprises a convex portion 5A delimited by the aforesaid two lateral faces 50 susceptible of rotating with respect to the cup 8 around the first and second adjustment axis Z, K with the surface of its convex portion 5A in contact and in sliding-with-friction relation with the internal surface 10A of at least one connection wall 10, in order to maintain the plate 4 in the angular position reached following the rotation around the first and/or second adjustment axis Z, K.

Advantageously in accordance with a preferred embodiment of the present invention illustrated in the enclosed figures, the convex portion 5A of the appendage 5 has the shape of a cap, e.g. spherical.

The convex portion 5A of the appendage 5 is also preferably connected to the support portion 5' through a neck 5", in particular with frustoconical shape, it too flattened at the two lateral flanks by the continuations of the two aforesaid lateral faces 50 of the convex portion 5A.

The appendage 5 thus has dimensions such to be housed to size in the internal containment chamber 80 of the aforesaid cup 8, with its flat faces 50 arranged facing the lateral walls 9 of the cup 8.

The latter are preferably flat and parallel to each other, while the opposite lateral faces 50 of the appendage 5 advantageously have shaped profiles, which—although they maintain the orientation thereof facing the lateral walls 9 of the cup 8—are not flat and parallel to each other. Such profile is designed for allowing an easy insertion of the appendage 5 in the cup 8 itself and a high (though in any case pre-established) rotation angle of the plate 4. For such purpose, the appendage 5 has a tapered terminal portion that is easily inserted in the cup 8. Therefore, the appendage 5 has, starting from its free end towards the rear face 4B of the plate 4, first a section that is enlarged and then, after a first section, a section that is narrowed, as seen for example in the detail FIGS. 14A and 14B. The lateral faces therefore have a profile formed by two sections connected by a vertex in a median longitudinal section view made along a plane passing through the extension axis J, as seen for example in the same FIGS. 14A and 14B.

The plate 4 can be manually adjusted with regard to its position, respectively by rotating it around the first adjustment axis Z and around the second adjustment axis K in order to obtain a movement with rightward and leftward orientation and in order to obtain a movement with upward and downward orientation, as represented in FIG. 17 and in FIG. 14, respectively.

During the aforesaid adjustment movements, the appendage 5 is therefore rotated within the internal containment chamber 80 of the cup 8 around the first and/or second adjustment axis Z and K with the surface of its convex portion 5A in contact and in sliding-with-friction relation on the internal surface 10A of at least one connection wall 10 (and advantageously on the two upper and lower connection surfaces) in order to maintain the plate 4 in the angular position reached after the manual adjustment operations with rotations around the first and/or second adjustment axis Z and K, once it has been released in such position.

Such friction is obtained by means of a coupling with slight interference between the aforesaid two contact surfaces, respectively of the appendage 5 and of the cup 8.

The static friction force between the two contact surfaces is in fact susceptible of maintaining the plates 4 of the nosepieces in position with suitable strength, in order to prevent undesired movements thereof. However, the dynamic friction present between the contact surfaces is capable of allowing a precise and facilitated friction adjustment of the position.

In this manner, each time the eyeglasses 100 are taken off, the nosepieces 1 remain in their correct orientation defined by the shape of the user's nose, for position adjustments that involved a rotation around the first adjustment axis Z, for position adjustments that involved a rotation around the second adjustment axis K, as well as for position adjustments that involved, as is more common, a combination of both aforesaid rotations.

The above-indicated two rotations therefore allow the adjustment of a plurality of intermediate adjustments.

All of these adjustments are also easy and regular due to the slight but constant friction, given by the sizing with interference between the external surface of the convex portion 5A of the appendage 5 and the internal surface of the connection walls 10 of the cup 8, ensuring movements of the appendage without the unpleasant sensation of the nosepieces of known type, with excessive clearance of the plate 4 that therefore "rocks" in an undesired manner.

Preferably, the first and the second anchorage elements 70, 71 are in the form of male/female elements, i.e. protuberances and seats (or vice versa) shaped for a mutual engagement, or to allow the protuberances to house within the seats.

Such protuberances and such seats are mechanically engaged with each other in a retention relationship with snap connection following an elastic movement or an elastic deformation given thereto, or given, in addition or alternatively, to at least one part of the appendage 5 or of the cup 8 on which the protuberances and the seats are provided.

In accordance with a first particular embodiment of the invention illustrated in FIGS. 1-18, the first anchorage elements 70 comprise two protuberances in the form of elastically flexible tabs, each of which extended in a single body from one of the two lateral walls of the cup 8 towards its interior. In turn, the second anchorage elements 71 comprise two seats, each of which obtained in one of the two faces 50 of the appendage 5 and susceptible of at least partially housing in a mechanical engagement relationship a corresponding tab 70.

Preferably, the seats 71 have a step-like form with two faces converging towards a corner, of which an abutment face 71A is substantially directed towards the rear face 4B of the plate 4 in order to make a pointing surface, and a connector face 71B, with size larger than that of the abutment face 71A, which decreases the depth of the seat towards the same rear face 4B of the plate 4.

The tabs 70 are in turn extended inside the cup 8, moving away from the rear face 4B of the plate 4 and terminating with a free end susceptible of abutting against the abutment face 71A of the seats 71 in order to prevent the exit of the appendage 5 from the cup 8.

The engagement of the tabs 70 in the seats 71 is with a clearance such to allow the appendage 5 to rotate within the cup 8 around the two adjustment axes Z and K.

In accordance with a second embodiment of the nosepiece according to the invention, illustrated in FIGS. 19-29, the first anchorage elements 70 comprise two protuberances in the form of buttons, each of which projectingly extended in a single body from one of the lateral walls 9 of the cup 8 towards the interior of the latter.

In turn, the second anchorage elements comprise two seats 71, each of which obtained in one of the lateral faces 50 of the appendage 5 and susceptible of at least partially housing in a mechanical engagement relationship a corresponding button 70.

The cup 8 is advantageously obtained, for example, starting from a suitably cut and bent metal strip. The protuberances 70 adapted to be snappingly inserted in the corresponding seats 71 obtained in the appendage 5 are preferably made via cutting and bending if they are formed as tabs like in the first embodiment (see FIG. 10), or via plastic deformation to form two rivets towards the interior of the cup 8, if they are formed by buttons as in the second embodiment (see FIG. 25).

The appendage 5 is instead preferably obtained in both examples with the seat 71 obtained by means of a plastic material molding process.

In accordance with a third embodiment of the nosepiece according to the invention, illustrated in FIGS. 30-40, in a different but equivalent manner with respect to the first two embodiments, the first anchorage elements 70 comprise two aligned holes obtained on the lateral walls 9 of the cup 8, while the second anchorage elements 71 comprise two protuberances, each of which provided projectingly from one of the faces 50 of the appendage 5 and susceptible of being at least partially inserted in a mechanical engagement relationship within the corresponding hole 70.

In this case, preferably, the protuberances 71 have a step-like form with extension tapered in moving away from the rear face 4B of the plate 4 in order to form an inlet for the insertion of the same protuberances 71 in the holes 70. The step-like form has an abutment face 71A, which is substantially directed towards the rear face 4B of the plate 4 in order to obtain a pointing surface. The abutment face 71A is extended starting from a tilted connector face 71B of the appendage 5, which is enlarged starting from the rear face 4B of the plate 4.

The holes 70 receive the protuberance 71 with step-like form with an edge susceptible of receiving, in abutment, the abutment face 71A of the protuberances 71 in order to prevent the exit of the appendage 5 from the cup 8.

In all the above-presented embodiments, there is a clearance between the first and the second anchorage elements in order to allow the rotation of the appendage 5 in the cup 8 around the two adjustment axes Z and K.

Nevertheless, both rotations of the appendage 5 must comprise final limitations of the end stops. In particular, the rotation around the first adjustment axis Z is limited at the two right/left ends by the neck 5" of the appendage 5, in particular with frustoconical shape, against which the cup 8 is susceptible of impacting by means of the internal surfaces of its lateral walls 9 (FIG. 14A, 14B) so as to define two first end stops for the rotation around the first adjustment axis Z, as seen in the detail of FIG. 16.

Analogously, the neck 5" of the appendage 5 is susceptible of impacting against the internal surfaces of the upper and lower connection walls 10 of the cup 8 (FIG. 17A, 17B), defining two second end stops of the rotation around the second adjustment axis K as seen in the detail of FIG. 18.

Alternatively (or in addition), the rotation around the first adjustment axis Z can be limited at the two right/left ends due to the coupling between the two protuberances 70 of the cup 8 and the abutment faces 71A of the two seats of the appendage 5 which also carry out the function of stop for the rotation, as seen in detail in FIG. 15.

In accordance with an advantageous characteristic of the present invention, the cup 8 has an annular extension defined by the flat lateral walls 9 and by the connection walls 10 which is interrupted by a notch 28, which is extended parallel to the main extension axis J of the appendage 5 i.e. of the forward-back central axis of the cup 8.

The latter allows increasing the elasticity of the anchorage means associated with the cup 8, facilitating an elastic engagement thereof to the opposite anchorage means provided on the appendage 5.

Therefore, in accordance with the first two embodiments, the notch 28 allows enlarging the ring and hence allows a greater elastic movement for the tabs and button 70 in order to have a more facilitated insertion in the seat 71 of the appendage 5; in accordance with the third embodiment, the notch 28 allows, always by opening the ring of the cup 8, an elastic movement even of the holes 71, allowing an easier insertion of the protuberances 70 provided on the appendage 5.

In addition, the friction between the external surface of the convex portion 5A of the appendage 5 and the internal surface 10A of the connection walls 10 of the cup 8 is given by the sizing with interference of the containment chamber 80 of the cup and the external height of the appendage 5.

Therefore, advantageously in order to facilitate the attainment of the correct level of friction of the appendage 5 in the cup 8, it is possible to adjust the pressure exerted between the two contact surfaces by enlarging or narrowing, by means of deformation, the notch 28 in order to respectively decrease or increase the elastic compression force of the external surface of the convex portion 5A of the appendage 5 on the internal surface of the connection walls 10 of the cup 8.

In the case of the first two embodiments, the notch 28 in the annular extension of the cup 8 is preferably obtained in a corner between a lateral wall 9 and a connection wall 10 in order to maintain the entire connector surface useful for the friction on the convex surface 5A of the appendage 5, while in the case of the third embodiment the notch 28 in the annular extension of the cup 8 is preferably obtained in a middle position of the lower connection wall.

Figure 41:
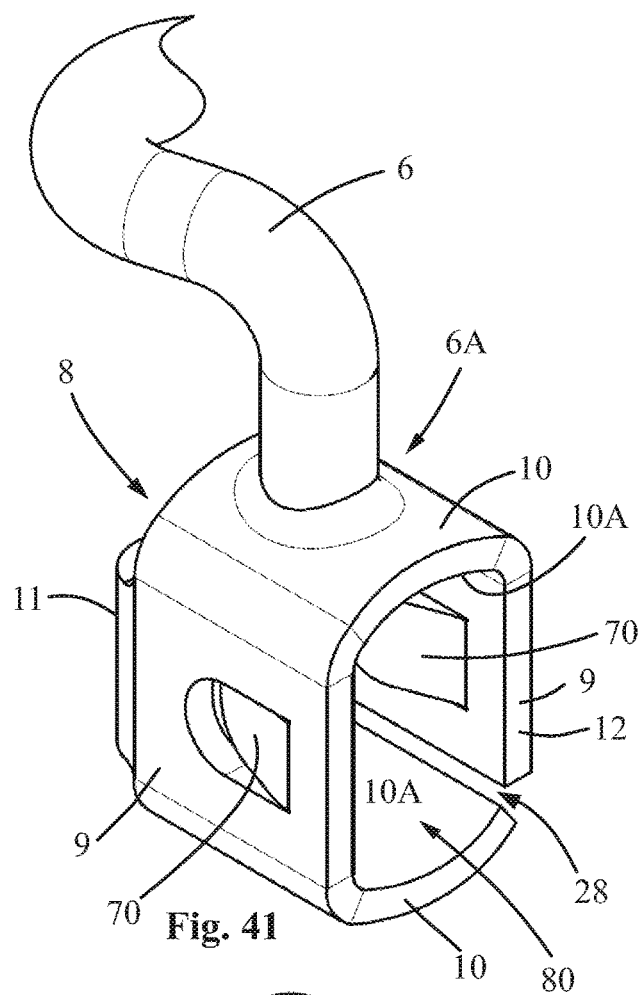
FIGS. 41 and 42 show two different perspective views, including a front and a rear perspective view of an enlarged detail relative to a support arm and a cup fixed thereto in accordance with an embodiment variant with the cup provided with a bottom wall.
Figure 42:
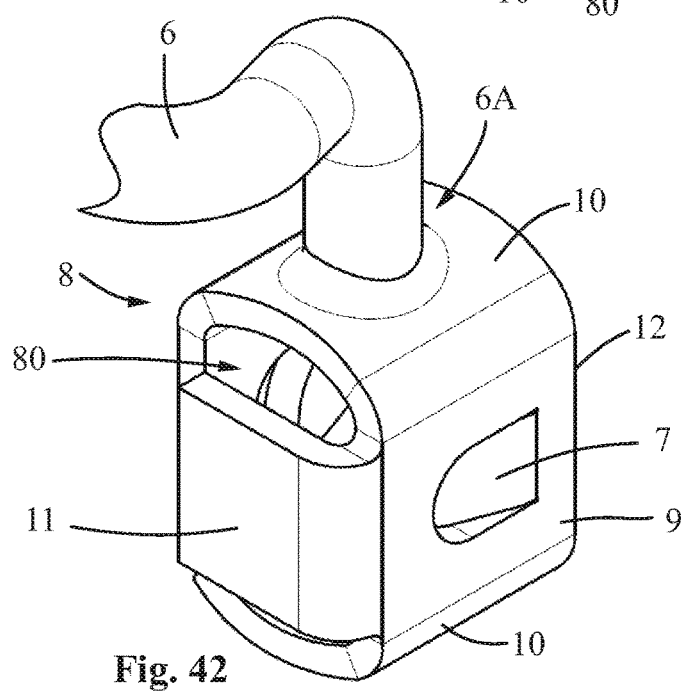

The chamber 80 delimited by the cup 8 can also be further closed with a bottom wall 11, which is fixed without interruption to at least one lateral wall (according to the embodiment illustrated in FIGS. 41 and 42, but it can otherwise be fixed, in addition or alternatively, to a connection wall 10) so to face an opening 12 for the insertion of the appendage 5.

The bottom wall 11 will advantageously have the purpose of closing the cup 8 which, in addition to better closing the cup itself, serves for preventing the appendage 5 from going too far back in the cup 8, with the risk of working poorly and being locked in its rotation.

Figure 43:
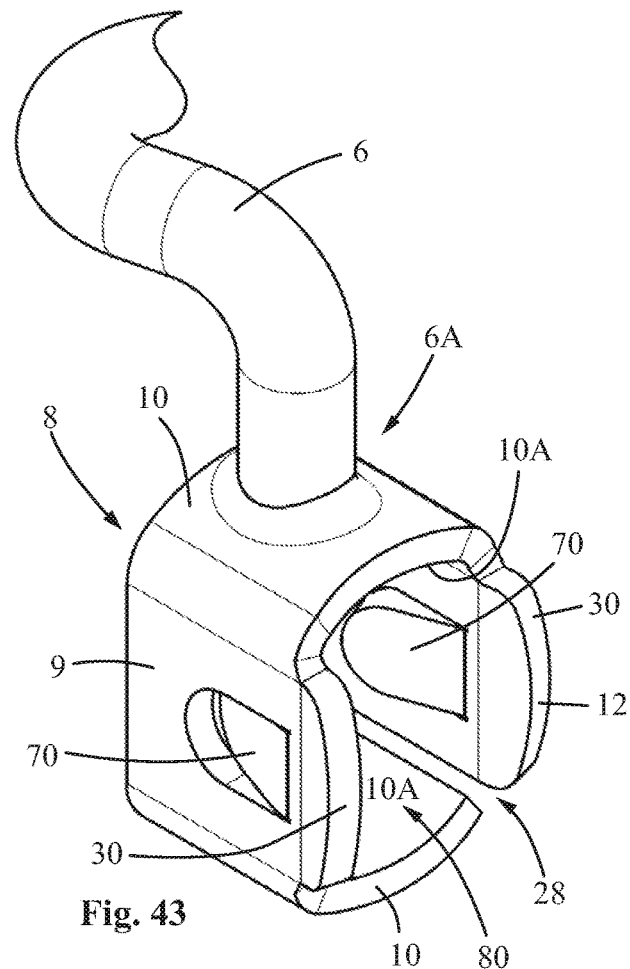
FIGS. 43 and 44 show two different perspective views, including a front and a rear perspective view of an enlarged detail relative to a support arm and a cup fixed thereto in accordance with a further embodiment variant with the cup provided with prolongation strips.
Figure 44:
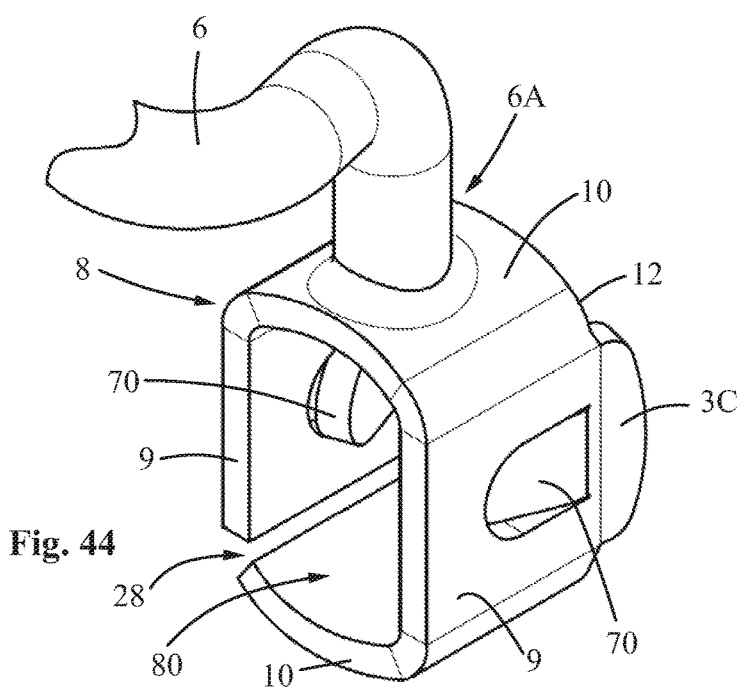

For the same purpose of preventing the appendage 5 from going too far back in the cup, the lateral walls 9 of the cup 8 are extended towards the rear face 4B of the plate 4 beyond the upper and lower connection walls 10 by means of two front prolongation strips 30, illustrated in particular in FIGS. 43 and 44 (but also present in the third embodiment).

The nosepiece 1 thus conceived therefore attains the pre-established objects and in particular it is capable of conferring considerable adjustment freedom to the plates 4 along at least two rotation axes, through a joint mechanism obtained with the appendage 5, the cup 8 and the coupling means 7 which substantially has the mobility characteristics of ball joints, as well as the characteristics of easy mounting of snap nosepieces that are quite simple and inexpensive to achieve.

A further advantage of the nosepiece 1 of this type lies in being constituted by only two components, without any need for additional elements such as screws or pins or particular equipment for mounting.

The nosepiece 1 according to the invention also has the advantage of having greater strength and mechanical retention assurance of the plate 4 with respect to the conventional ball/socket mechanisms of known type, due to the presence of the coupling means with abutment faces with step-like form which prevent the accidental exit of the appendage 5 once inserted in the cup 8.

A further advantage of the nosepiece 1 of this type lies in the interchangeability of the plate 4 according to the invention with the plates intended for the snap connection of the conventional nosepieces that are easy to find on the market, though losing the precise adjustment possibilities with constant friction and maintenance of the position reached by the plate 4 allowed by the nosepiece 1 according to the present invention.

A further advantage of the nosepiece 1 according to the invention lies in the greater extension of the rotation angles of the plate 4 with respect to the screw nosepieces solutions of known type.

A further advantage of the nosepiece 1 according to the invention lies in the presence of end stops for limiting the rotation of the plate 4 that are more precise and stronger than those of the state of the art.

A further advantage of the nosepiece 1 according to the invention lies in the fact that once the adjustment of the position of the plates 4 is carried out, such position remains saved/in place even after the eyeglasses are taken off, due to the coupling via interference present between the convex portion 5A of the appendage 5 and the internal surface of the cup 8.

The invention claimed is:

1. Nosepiece for eyeglass frames, which comprises:
   a plate (4) provided with a front face (4A), intended to abut against the nose of a user, and with a rear face (4B);
   a support arm (6) provided with a first end (6A) mechanically associated with the rear face (4B) of said plate (4) and with a second end (6B) fixed to the frame (20) of eyeglasses (100);
   a cup (8), which is extended from the first end (6A) of said support arm (6) along a first adjustment axis (Z), and is provided with at least two opposite lateral walls (9), joined together by at least one connection wall (10);
   an appendage (5), which is projectingly extended from the rear face (4B) of said plate (4) and is at least partially housed within said cup (8) with two lateral faces (50) thereof facing the two lateral walls (9) of said cup (8);
   coupling means (7) for retaining said appendage (5) housed within said cup (8), comprising first and second anchorage elements (70, 71) respectively associated with the lateral walls (9) of said cup (8) and with the facing lateral faces (50) of said appendage (5), mechanically engaged with each other and aligned along a second adjustment axis (K);
   characterized in that said appendage (5) comprises a convex portion (5A) delimited by said two lateral faces (50) susceptible of rotating with respect to said cup (8) around said first and second adjustment axis (Z, K) with the surface of its convex portion (5A) in contact and in sliding-with-friction relation with the internal surface (10A) of said at least one connection wall (10), in order to maintain said plate (4) in the angular position reached around said first and second adjustment axis (Z, K).

2. Nosepiece for eyeglass frames according to claim 1, characterized in that the lateral walls (9) of said cup (8) are substantially flat and facing the lateral faces (50) of said appendage (5).

3. Nosepiece for eyeglass frames according to claim 1, characterized in that the first and the second anchorage elements (70, 71) have the form of protuberances or seats or vice versa, which are shaped with the seats adapted to house said protuberances; said protuberances and said seats (70, 71) being mechanically engaged in a retention relationship with elastically snap connection.

4. Nosepiece for eyeglass frames according to claim 3, characterized in that said first anchorage elements (70) comprise two protuberances in the form of elastically flexible tabs, each of which extended in a single body from one of said lateral walls (9) of said cup (8) towards its interior, and said second anchorage elements (71) comprise two seats, each of which obtained in one of the faces (50) of said appendage (5) and susceptible of at least partially housing, in a mechanical engagement relationship, a corresponding said tab (70).

5. Nosepiece for eyeglass frames according to claim 4, characterized in that said seats (71) have a step-like form with an abutment face (71A) substantially directed towards the rear face (4B) of said plate (4) and said tabs are extended away from the rear face (4B) of said plate (4) terminating with a free end susceptible of abutting against the abutment face (71A) of said seats (71).

6. Nosepiece for eyeglass frames according to claim 5, characterized in that the abutment of the free ends of the tabs (70) against the abutment face (71A) of said seats (71) defines two end stops of the rotation of said appendage (5) around said first adjustment axis (Z).

7. Nosepiece for eyeglass frames according to claim 3, characterized in that the first anchorage elements (70) comprise two protuberances in the form of buttons, each of which extended in a single body from one of said lateral walls (9) of said cup (8) towards its interior, and said second anchorage elements (71) comprise two seats, each of which obtained in one of the lateral faces (50) of said appendage (5) and susceptible of at least partially housing in a mechanical engagement relationship a corresponding said button (70).

8. Nosepiece for eyeglass frames according to claim 3, characterized in that the first anchorage elements (70) comprise two aligned holes obtained on the lateral walls (9) of said cup (8), and said second anchorage elements (71) comprise two protuberances, each of which projectingly extended in a single body from one of the lateral faces (50) of said appendage (5) and susceptible of being at least partially inserted in a mechanical engagement relationship within said corresponding hole (70).

9. Nosepiece for eyeglass frames according to claim 8, characterized in that said protuberances (71) have a tapered extension in moving away from the rear face (4B) of said plate (4) and have a step-like form with an abutment face (71A) substantially directed towards the rear face (4B) of said plate (4) and susceptible of abutting against the edge of said hole (70).

10. Nosepiece for eyeglass frames according to claim 1, characterized in that said cup (8) has an annular extension defined by said flat lateral walls (9) and by said connection walls (10); a notch (28) being provided to interrupt said annular extension.

11. Nosepiece for eyeglass frames according to claim 1, characterized in that said cup (8) comprises a bottom wall (11) opposite an opening (12) for inserting of said appendage (5) in said cup (8).

12. Nosepiece for eyeglass frames according to claim 1, characterized in that the lateral walls (9) of said cup (8) are joined at the two opposite ends by an upper connection wall (10) and by a lower connection wall (10) on which the external surface of the convex portion (5A) of said appendage (5) rotates with friction with respect to said first longitudinal axis (Z) and with respect to said second transverse axis (K).

13. Nosepiece for eyeglass frames according to claim 1, characterized in that the convex portion (5A) of said appendage (5) is extended towards said plate (4) by means of a neck (5") susceptible of impacting against the internal surfaces of the lateral walls (9) of said cup (8) defining two first end stops of said rotation around said first adjustment axis (Z).

14. Nosepiece for eyeglass frames according to claim 1, characterized in that the convex portion (5A) of said appendage (5) is extended towards said plate (4) by means of a neck (5") susceptible of impacting against the internal surfaces of the upper and lower connection walls (10) of said cup (8) defining two second end stops of said rotation around said second adjustment axis (K).

15. Nosepiece for eyeglass frames according to claim 1, characterized in that the lateral walls (9) of said cup are extended towards the rear face (4B) of said plate (4) beyond said at least one connection wall (10) by means of two front prolongation strips (30).

\* \* \* \* \*